Patented July 31, 1945

2,380,476

UNITED STATES PATENT OFFICE 2,380,476

CATALYSTS FOR THE ADDITION POLYMERIZATION OF UNSATURATED ORGANIC COMPOUNDS

William D. Stewart, Akron, Ohio, assignor to The B. F. Goodrich Company, New York, N. Y., a corporation of New York No Drawing. Application February 19, 1941, Serial No. 379,716

12 Claims. (Cl. 260—84.5)

This invention relates to the polymerization of unsaturated organic compounds which are capable of undergoing an addition polymerization to form high molecular weight linear polymers, more particularly to the polymerization of conjugated butadienes either alone, in mixtures with one another or with other polymerizable comonomers such as the vinyl and vinylidene compounds. The principal object of the invention is to provide a new class of catalysts or accelerators of polymerization by the use of which improved polymers may be obtained in increased yield and in a much shorter interval of time.

It is known that addition polymerizations may be accelerated or promoted by the presence of various substances among which are oxygen and oxygen yielding compounds such as hydrogen peroxide, benzoyl peroxide and per-salts. However, with the use of such known polymerization initiators, considerable difficulty is still experienced in obtaining high yields of a desirable polymer in a short interval of time. Particularly in the commercial manufacture of polymers by emulsion polymerization, the production schedule is frequently disrupted by slow reactions and long induction periods before the polymerization starts.

I have now discovered a large number of substances which have been termed redox systems because of their property of catalyzing or promoting oxidation reduction reactions, particularly those occurring in biological processes, which substances are quite effective in promoting addition polymerizations and which are vastly superior to any previously described polymerization initiators or accelerators in that the polymerization is carried out in a much shorter time, the induction period is largely eliminated, lower temperatures for the polymerization may be employed and consequently a higher molecular weight more linear polymer possessing more desirable properties is obtained.

The class of redox systems with which the present invention is concerned, is that class which comprises an organic aliphatic polyhydroxy compound having a heavy metal salt combined therewith. The class of organic compounds designated as aliphatic polyhydroxy compounds includes those aliphatic organic compounds containing two or more hydroxy groups whether of the open chain aliphatic series or the closed chain or cycloaliphatic series. Accordingly, there may be mentioned as examples of compounds in this class the dihydric alcohols such as ethylene glycol; trihydric alcohols such as glycerine; tetrahydric alcohols such as erythritol; pentahydric alcohols such as adonitol, arabitol, xylitol, rhamnitol and the like; hexahydric alcohols such as d-, l- or dl mannitol, d or l iditol, sorbitol, dulcitol, d-talitol, rhamnohexitol and the like; the cycloaliphatic dihydric alcohols of the cyclopentane series such as cyclopentane, 1-2 diol; the cycloaliphatic di, tri and polyhydric alcohols of the cyclo-hexane series such as cyclohexane 1-2 diol, resorcitol, quinitol, pyrogallitol, phloroglucitol, cyclohexane, 1,2,3,4 tetrol, quercitol, inositol, dambonitol, pinitol, quebrachitol, scyllitol, mytillitol and the like; cycloaliphatic dihydric alcohols of the cycloheptane series such as cycloheptane-1-2 diol; cycloaliphatic polyhydric alcohols of the terpene, menthane or pinene series such as terpin, pinol hydrate and the like and other aliphatic compounds containing two or more hydroxy groups. Also included in this class of compounds are those which contain another functional group in addition to the two or more hydroxy groups such as the aldo, keto or amino substituted derivatives of the polyhydroxy compounds. Especially important in this group are the aldo, and keto derivatives of straight chained polyhydroxy compounds or, as they are commonly called, the sugars. Among these are the aldotrioses such as glycerose; ketotrioses such as dioxyacetone; aldotetroses such as erythrose and threose; ketotetroses such as erythrulose; aldopentoses such as arabinose, xylose, lyxose, and ribose; ketopentoses such as araboketose and xyloketose; aldohexoses such as glucose, galactose, mannose, gulose, idose, talose, allose and the like; ketohexoses such as fructose or levulose, sorbose and the like; and other sugars including the disaccharides and trisaccharides such as sucrose, maltose, lactose and raffinose. Other derivatives of polyhydroxy compounds included in this invention are the amino substituted polyhydroxy compounds such as galactamine, glucosamine, fructose amine and the like.

As hereinabove stated these aliphatic polyhydroxy compounds are effective in promoting polymerizations when combined with a heavy metal salt. The term "heavy metal" as used herein is meant to include metallic elements which have a density greater than four, an atomic weight greater than forty and a low atomic volume (ratio of atomic weight to density) and consequently appear substantially at the minimum points above an atomic weight of forty on Lothar Meyer's curve of atomic volumes. (See any standard textbook of Inorganic Chemistry such as Ephraim "Textbook of Inorganic Chemistry," page 30, or Caven and Lander "Systematic Inorganic Chemistry" facing page 30.) The term "heavy metal" includes, therefore, those metallic elements appearing in the center positions of the long periods of a periodic table arranged in short and long periods, and especially those occurring in the 6th to 12th positions of the long periods (considering the alkali metals to occupy the first position and all the rare earth metals to occupy a single position), that is, the elements occurring in group VIII of the Mendeleef Periodic Table such as iron, cobalt and nickel, those in sub-group B of group I and II of the Mendeleef Periodic Table such as copper, silver, zinc, cadmium and mercury, and those in subgroup A of groups VI and VII of the Mendeleef Periodic Table such as chromium, manganese and molybdenum.

The class of redox systems of this invention is meant to include broadly any of the heavy metals mentioned above when in the form of one of their salts combined with any of the polyhydroxy compounds mentioned above. The metal may be combined with the polyhydroxy compound either as a complex compound of uncertain chemical structure, or combinations of polyhydroxy compounds and heavy metals not known to form complexes may be used. In the latter event the redox system will consist of a mixture of the metal in the form of one of its simple salts together with the polyhydroxy compounds. The preferred redox systems are those which contain a polyhydroxy compound containing from three to five hydroxy groups, and from four to six carbon atoms or a polyhydroxy compound containing from three to five hydroxy groups, from four to six carbon atoms and another group such as aldo, keto, or amine groups, preferably aldo or keto groups, in combination with the salts of heavy metals occurring in the 6th to 12th positions of the first long period of the periodic table such as iron, cobalt, nickel, copper and manganese. The compounds which occur naturally or are derived from naturally occurring substances such as the sugars, and the naturally occurring cyclitols, in combination with a water soluble heavy metal salt, are particularly preferred. Specifically, the keto hexose sugars such as levulose or sorbose, the aldo hexose sugars such as glucose and the naturally occurring cyclitol, quebrachitol, are especially desirable in the practice of this invention.

In the practice of this invention monomeric compounds or mixtures of monomers are polymerized by well known methods of polymerization such as by polymerization in homogeneous systems or by polymerization in emulsions in presence of catalytic amounts of the redox systems of this invention. In the emulsion polymerization process which is at present preferred, the monomer or monomer mixture is emulsified in a non-solvent liquid, usually water, with the aid of an emulsifying agent and polymerization is then effected by adding the heavy metal, polyhydroxy compound of this invention together, if desired, with various other substances, the nature of which will be described hereinafter, and agitating the emulsion until polymer is formed. The resulting polymerized emulsion containing polymer particles dispersed in a liquid medium greatly resembles natural rubber latex and may be coagulated in the usual manner to yield the solid polymer.

The amount of the redox systems to be used in polymerization may be varied over rather wide limits provided that an excessive amount of the redox system does not inhibit or poison the polymerization reaction. For most purposes only catalytic amounts of the redox system, say less than 2% by weight based on the weight of the monomers, are preferred and in most instances the polymerization proceeds most rapidly when from 0.05 to 1% of the redox system is present. When the polyhydroxy compound and heavy metal are added as separate compounds a mixture of about .5% of the polyhydroxy compound and 0.1% of the heavy metal salt is preferred. When using some heavy metals, particularly copper and manganese, however, it is desirable to use even smaller concentrations of the heavy metal salt, less than 0.01%, since these metals in higher concentration tend to inhibit the polymerization.

As has been mentioned hereinabove, the redox systems of this invention may be used, generally, in the polymerization of those unsaturated organic compounds which are capable of undergoing an addition polymerization to form a high molecular weight linear polymer. Included in this class of monomers are the conjugated butadienes such as butadiene, isoprene, dimethyl butadiene, chloroprene, piperylene and the like all of which contain a

group; monomer mixtures of two or more of these butadienes such as a mixture of butadiene and dimethyl butadiene; and monomer mixtures of one or more of these conjugated butadienes with one or more other compounds which also contain a

group and copolymerize with conjugated butadienes such as mixtures of butadiene with vinyl compounds including aryl olefins and substituted aryl olefins such as styrene, p-chloro styrene, p-methoxy styrene, vinyl naphthalene and the like, acrylic and methacrylic acids, esters, nitrils and amides such as acrylic acid, acrylonitrile, methacrylonitrile, methylacrylate, methyl methacrylate, butyl acrylate, methacrylamide and the like and other vinyl compounds such as vinyl ketones, vinyl ethers, vinyl carbazole, vinyl furane and the like. Monomer mixtures of butadienes with other compounds, besides vinyl type compounds, which also contain a

group such as vinylidene chloride and the like may also be used. All these monomers and monomer mixtures when polymerized or copolymerized in the manner herein described form high molecular weight linear polymers. When the conjugated butadiene is the monomer or is the predominant constituent of a monomer mixture such polymers are rubbery in character and may be called synthetic rubber.

Other monomers or monomer mixtures which are capable of undergoing an addition polymerization and which may be used in the process of this invention are the above mentioned vinyl and vinylidene compounds as well as other vinyl compounds such as vinyl chloride and vinyl acetate, either alone or in mixtures with one another, all of which polymerize to yield a linear polymer of a thermoplastic resinous character.

The polyhydroxy compound, heavy metal redox systems of this invention may be used in the polymerization of monomers in emulsions prepared with various emulsifying agents and containing various other catalysts, initiators, promoters, accelerators or modifiers of polymerization. As emulsifying agents, partially neutralized fatty acid soaps such as 70-90% neutralized myristic or palmitic acids are particularly effective but well known emulsifying agents including completely neutralized fatty acid soaps such as sodium oleate and sodium palmitate and hymolal sulfates or sulfonates such as sodium sulfate and sodium isobutyl naphthalene sulfonate may also be employed.

The redox systems containing a polyhydroxy compound and a heavy metal salt are preferably used to accelerate polymerization initiated with a well known oxygen yielding compound such as hydrogen peroxide, benzoyl peroxide, potassium persulfate, sodium perborate, potassium percarbonate and the like, but may also be employed with other known polymerization initiators such as diazoaminobenzene, trichloracetic acid and carbon tetrachloride. They may also be used advantageously in polymerizations which employ a reducing agent such as sulfur dioxide as the polymerization initiator, or in polymerizations effected in presence of both an oxidizing and a reducing substance. Moreover the redox systems disclosed herein may be used to effect polymerizations carried out in the absence of an added initiator, such polymerizations being incapable of proceeding without the redox system.

They may also be employed in the polymerization of emulsions containing a polymerization modifier such as the dialkyl dixanthogens, diaryl disulfides, thiuram disulfides and other sulfur containing compounds known to increase the solubility and plasticity of polymers.

Although the exact manner in which the polyhydroxy compound heavy metal redox systems accelerate polymerization is not known with certainty, it is believed that the redox system promotes or catalyzes an oxidation reduction reaction which oxidizes or activates the monomer molecules to such an extent that they are then capable of initiating a chain reaction which produces a linear polymer. The redox system may directly catalyze the oxidation of the monomer by an oxidizing agent such as a peroxide, if such is present, or it may be auto-oxidizable, and be capable of inducing monomer oxidation or activation by an oxidation reduction involving the redox system itself, or some other mechanism may be responsible for the increase in the rate of polymerization and for the improved properties of the polymerization products. The association of small amounts of heavy metals with various polyhydroxy compounds in biological systems which undergo oxidation reactions is well known and many theories have been propounded for an explanation of such biological oxidoreductions. Since it is believed that the initiation of polymerization reactions is quite similar to biological oxidation reductions particularly as regards the role of the redox catalyst, analogies of polymerization systems with biological systems have proved of great value in elucidating the action of the redox systems of this invention. It is to be understood however, that the invention is not to be limited by any proposed theory since the inclusion of the substances herein described and herein designated as redox systems in polymerization mixtures greatly accelerate the process and also improves the quality of the polymerization products.

In order to illustrate the practice of this invention and to show the accelerating effect of the redox systems of this invention upon polymerization, an emulsion containing the following ingredients is prepared:

Butadiene _____ g__ 55
Acrylonitrile _____ g__ 45
Hydrogen peroxide (3½% solution) ____cc__ 10
Emulsifying solution (2% aqueous soln. of myristic acid 85% neutralized with NaOH) _____ cc__ 250
Polymerization modifier _____ g__ 0.3

This emulsion is then divided into equal parts and redox systems added to the emulsion as follows:

(1) No redox system added—control
(2) 0.05% by weight of ferrous ammonium sulfate—control
(3) 0.05% by weight (based on monomers) of ferrous ammonium sulfate
   0.50% by weight (based on monomers) of quebrachitol
(4) 0.05% by weight of ferrous ammonium sulfate
   0.50% by weight of levulose
(5) 0.05% by weight of cobalt chloride
   0.50% by weight of quebrachitol
(6) .001% by weight of cuprous chloride
   .05% by weight of levulose
(7) 0.10% by weight of cuprous chloride The emulsions are then placed in sealed glass tubes and rotated at 30° C. At various intervals the percent yield of polymer is determined. The rate of polymerization for the various tubes is shown as follows:

| Tube | Per cent yield after 7½ hours | Per cent yield after 10½ hours | Per cent yield after 12½ hours | Per cent yield after 23 hours | Per cent yield after 45 hours |
|---|---|---|---|---|---|
| (1) | 0 | 0 | 0 | 45 | 94 |
| (2) | 0 | 7 | 38 | 94 | |
| (3) | 69 | 82 | 94 | | |
| (4) | 61 | 86 | 93 | | |
| (5) | 51 | 74 | 93 | | |
| (6) | 57 | 80 | 94 | | |
| (7) | 0 | 0 | 0 | 0 | 0 |

It may be seen that with no redox system added, the polymerization is not started after 12½ hours and is not complete until 45 hours; with an iron salt alone, 23 hours are required; while with the redox systems of this invention containing a heavy metal salt and a polyhydroxy compound, polymerization is substantially complete after only 12½ hours. With a copper salt alone, there is no polymerization even after 45 hours, but with a copper salt levulose redox system polymerization is substantially complete in 12½ hours.

In another embodiment of the invention a monomer mixture containing 25 g. of styrene and 7.5 g. of butadiene is emulsified with 25 cc. of a 2% aqueous sodium myristate solution, and in presence of 0.035 g. of hydrogen peroxide 0.03 g. of a polymerization modifier and .20 g. of sodium pyrophosphate. The emulsion requires 110 hours at 30° C. to yield 82% of a rubber-like copolymer while a similar emulsion also containing 0.10 g. of dextrose and .005 g. of an iron salt requires only 71 hours at 30° C. to yield 92% of a rubber-like copolymer which is considerably more plastic and more soluble in acetone.

Other embodiments of the invention in which various other polyhydroxy compounds are used with salts of various heavy metals and with various monomer mixtures, initiators and emulsifying agents also show that the polymerization velocity is increased by the practice of this invention. For example it is possible to polymerize a butadiene vinyl-type comonomer mixture using a heavy metal salt and a sugar in a very short time without any initiator other than molecular oxygen, being present. Systems employing a sugar, molecular oxygen and other redox systems which contain a heavy metal salt combined with other compounds including sodium pyrophosphate, levulinic acid, beta-mercapto ethanol and cholesterol such as are disclosed in copending applications of William D. Stewart, Serial Nos. 379,713; 379,714; 379,715 and 379,717 filed Feb. 19, 1941, are also quite effective in promoting polymerizations.

In the practice of the invention it is sometimes desirable to add various substances other than those mentioned above to the polymerization recipe. For example, when employing redox systems which are very effective in biological processes such as the quebrachitol heavy metal system it may be desirable to add colloids which are present in biological systems as "carriers" for the redox system, such as proteins, peptides, polypeptides or other colloidal material. It may also be desirable to add materials which influence the quality of the finished polymer such as various plasticizing or stabilizing agents for the polymer.

The practice of this invention also allows polymerization to proceed rapidly under conditions where polymerization would ordinarily be impossible, because the great accelerating effect of the redox system more than counteracts the inhibiting effect of other substances which would prevent the polymerization. Many such inhibiting substances are difficult to exclude from the polymerization batch because they are present as impurities in the monomers or in other essential materials.

Although various embodiments of the invention have been herein disclosed, it is not intended that the invention be limited solely thereto for it will be obvious to those skilled in the art that many modifications and variations are within the spirit and scope of the invention as defined by the appended claims.

I claim:

1. The method which comprises subjecting a monomeric material comprising a polymerizable conjugated butadiene to polymerization in aqueous emulsion in the presence of a catalyst comprising a water-soluble heavy metal salt combined with a sugar, the total concentration of the heavy metal salt and the sugar being less than 2% by weight of the material polymerized and the concentration of the heavy metal salt being such that the polymerization proceeds more rapidly than in the absence of the heavy metal salt.

2. The method of claim 1 wherein the heavy metal salt is a salt of a heavy metal occurring in group VIII and the first long period of the periodic table.

3. The method which comprises subjecting a monomeric material comprising a mixture of a polymerizable conjugated butadiene and another compound which contains a

group and is copolymerizable therewith in aqueous emulsion, to polymerization in aqueous emulsion in the presence of a catalyst comprising a water-soluble heavy metal salt combined with a sugar, the total concentration of the heavy metal salt and the sugar being less than 2% by weight of the material polymerized and the concentration of the heavy metal salt being such that the polymerization proceeds more rapidly than in the absence of the heavy metal salt.

4. The method of claim 3 in which the heavy metal salt is a salt of a heavy metal occurring in the 6th to 12th positions of the first long period of the periodic table.

5. The method of claim 3 in which the heavy metal salt is a salt of a heavy metal occurring in the 6th to 12th positions of the first long period of the periodic table and the sugar is a monosaccharide.

6. The method of claim 3 in which the material polymerized is a mixture of butadiene-1,3 and a copolymerizable vinyl compound; the heavy metal salt is a salt of a heavy metal occurring in the 6th to 12th positions of the first long period of the periodic table; and the sugar is a monosaccharide.

7. The method of claim 3 in which the material polymerized is a mixture of butadiene-1,3 and a copolymerizable vinyl compound; the heavy metal salt is a salt of a heavy metal occurring in group VIII and the first long period of the periodic table; and the sugar is a ketohexose.

8. The method of claim 3 in which the material polymerized is a mixture of butadiene-1,3 and acrylonitrile and the catalyst comprises levulose and a water-soluble cobalt salt.

9. The method of claim 3 in which the material polymerized is a mixture of butadiene-1,3 and acrylonitrile and the catalyst comprises levulose and a water-soluble iron salt.

10. The method of claim 3 in which the material polymerized is a mixture of butadiene-1,3 and a copolymerizable vinyl compound; the heavy metal salt is a salt of a heavy metal occurring in the 6th to 12th positions of the first long period of the periodic table; and the sugar is an aldohexose.

11. The method of claim 3 in which the material polymerized is a mixture of butadiene-1,3 and acrylonitrile and the catalyst comprises glucose and a water-soluble copper salt.

12. The method which comprises subjecting a polymerizable material comprising an unsaturated organic compound which contains a $$CH_2=C{\Big\langle}$$

group and which undergoes in aqueous emulsion an addition polymerization to form a high molecular weight linear polymer, to polymerization in aqueous emulsion in the presence of a catalyst comprising a water-soluble heavy metal salt combined with a sugar, the total concentration of the heavy metal salt and the sugar being less than 2% by weight of the material polymerized and the concentration of the heavy metal salt being such that the polymerization proceeds more rapidly than in the absence of the heavy metal salt.

WILLIAM D. STEWART.